March 15, 1966          P. GANCEL          3,240,296
AUTOMATIC ADJUSTING AND KICKBACK DEVICE
Original Filed Oct. 24, 1960          2 Sheets-Sheet 1
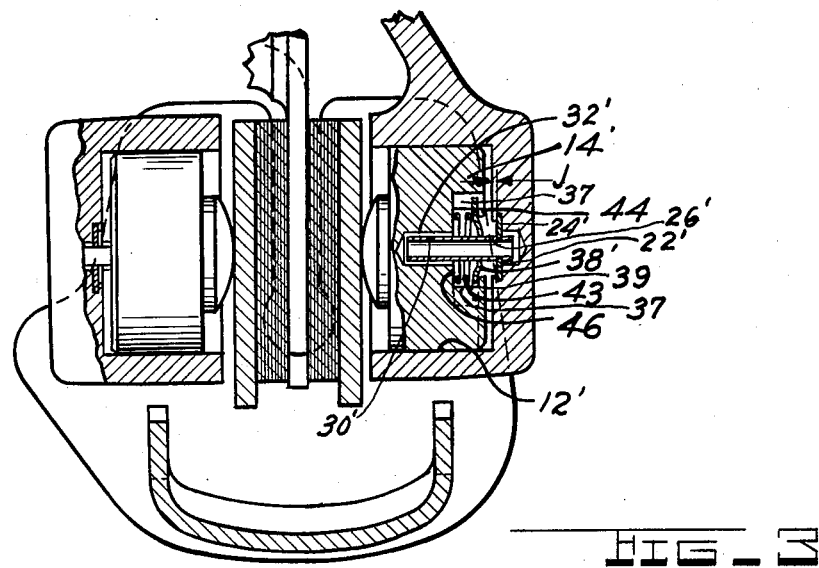
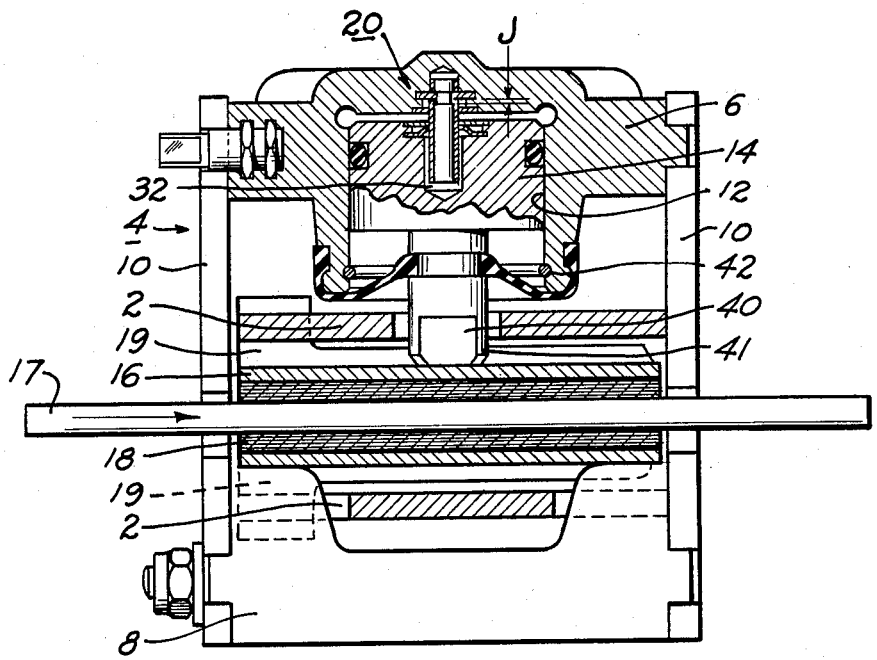
INVENTOR.
PIERRE GANCEL
BY John A. Young
ATTORNEY

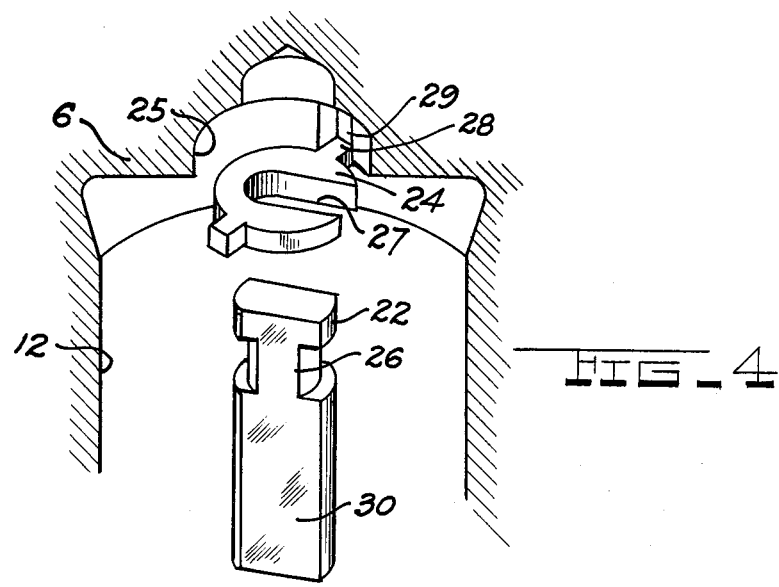
FIG_4
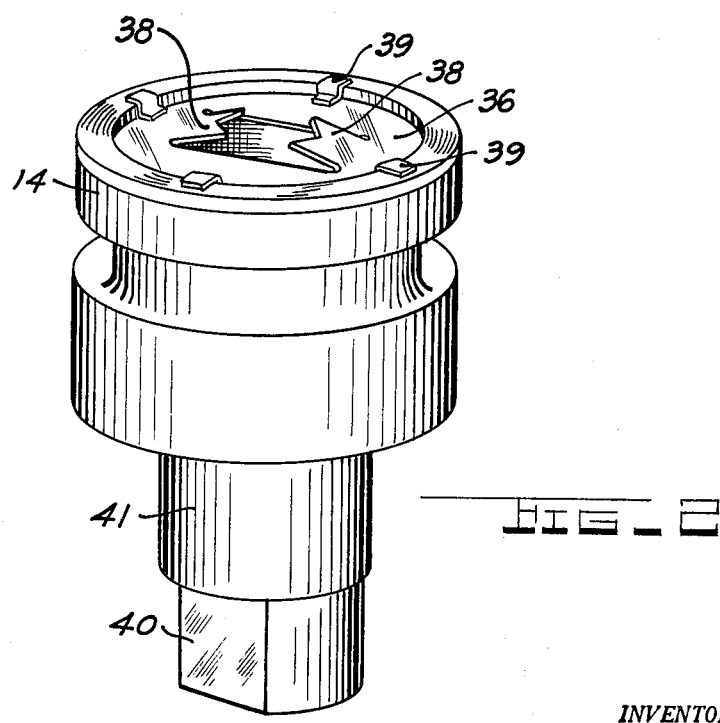
FIG_2

United States Patent Office 3,240,296
Patented Mar. 15, 1966

3,240,296
AUTOMATIC ADJUSTING AND
KICKBACK DEVICE
Pierre Gancel, Paris, France, assignor to Societe Anonyme
D.B.A., Paris, France, a company of France
Continuation of application Ser. No. 110,227, Oct. 24,
1960. This application Oct. 28, 1964, Ser. No.
407,259
Claims priority, application France, Nov. 12, 1959,
809,904, Patent 1,254,419
6 Claims. (Cl. 188—196)

This application is a continuation-in-whole of U.S. application Serial No. 110,227, filed October 24, 1960, and now abandoned.

This invention relates to an automatic adjusting mechanism for brakes and the like and is intended to compensate for the wear of the friction linings and to maintain a constant running clearance throughout the wear life.

The automatic adjusting mechanisms with which applicant is familiar fall generally in two classes: the first makes use of friction couplings for preventing the element to move in the adjusting direction until the friction force is exceeded. Such adjusting mechanisms have the drawback that a substantial portion of the applying force will be lost to overcome the frictional resistance if the resistance is large enough to prevent the shocks and chatter to move the element from its adjusted position and increase its lost motion. The second type embodies one-way clutches or wedging couplings which oppose to return of the element a force far in excess to that required for moving it forward. Although such adjusting mechanisms seem more interesting, they have found for applications in disk brakes because the clutch or coupling should be rendered inoperative to enable return of the adjusting mechanisms to its initial position. Such operation often comprises a time-consuming dismantling of a part of the applying mechanism and requires that the adjusting mechanism be within easy access.

The drawbacks of adjusting mechanisms of the first type are particularly acute in automotive disk brakes with straight physical actuation where the running clearance should be kept at a value as low as possible; as to the second type mechanisms, they should be provided with means for rendering the clutch or coupling inoperative if they are to be practical. It is an object of the invention to obtain an adjusting mechanism having a one-way coupling which may readily be rendered inoperative for enabling return of the adjusted element to its initial position.

Another object of the present invention resides in the provision of an automatic adjusting device which is effective to maintain a constant running clearance for the brake which is determined only by the wear condition of the friction pads. An overall object of the present invention is to provide an automatic brake adjuster which is easy to manufacture and service, and retain reliability.

The invention will be described by way of example with reference to disk brakes of the "sliding saddle" type and of the "caliper" type. In the first type, it is possible to use an automatic adjusting device having a one-way clutch opposing the return movement of the element to be adjusted with a large force, since the saddle is able to slide as a whole with respect to the support member and to follow the axial deflection in excess of the running clearance, particularly when cornering. In the brakes of the second type, it is necessary to compensate for such deflections, since the caliper remains stationary and cannot follow the disk deflections in the axial direction.

It is accordingly an important object of the invention to adopt an automatic adjuster of the above type to disk brakes of the "caliper" type.

More particularly, it is an object of the invention to provide an automatic adjusting mechanism including a resilient deflection absorbing coupling whereby temporary deflections of the disk in excess of the running clearance are compensated and the normal clearance is re-established as soon as the disk deflection excesses.

These and other objects of the invention will appear from the following description which refers to the accompanying drawings, forming a part of the specification and wherein:

FIGURE 1 is a schematic view of a disk brake of the "sliding saddle" type having an automatic adjusting mechanism embodying the present invention, the brake being shown in cross section along the diametral plane of the cylinder perpendicular to the midplane of the brake.

FIGURE 2 is an exploded view of the automatic adjusting mechanism of the brake in FIGURE 1, and FIGURE 3 is a schematic view of a disk brake of the "caliper" type having two opposed hydraulic cylinders, each of which has an automatic adjusting according to another embodiment of the invention; the brake is shown in partial cross section along its midplane.

FIGURE 4 shows parts of the adjusting means of FIGURE 1.

Referring to the drawings, FIGURE 1 shows the invention embodied in a "sliding saddle" disk brake of the type shown in French patent application of addition No. 769,217, now French Patent Number 74,065, in the name of Société Anonyme Bendix, and reference is made to this patent for a complete description of the brake.

The brake comprises a stationary support member 2 slidably supporting a built-up saddle 4 straddling the disk, the saddle consists of a cylinder casting 6 and a brake member 8 connected by a pair of C-shaped yoke members cylinder bore 12 machined in the cylinder casing slidably and sealingly receives a piston 14. When fluid under pressure is admitted into the cylinder bore through a passage (not shown), the pressure force on the piston thrustly applies a friction pad 16 against one of the flat faces of a rotating disk 17. The pressure force on the end wall of the bore is transmitted by the yoke members 10 to the brace member 8 which applies another friction pad 18 against the other face of the disk 17. Each friction pad is formed with anchoring lugs 19 slidably received in slots of the support member and which transmit the circumferential shifting thrust exerted by the disk on the pads to the support member.

An automatic adjusting mechanism, designated as a whole by the reference numeral 20, functions to position the retracted piston with respect to the cylinder housing and moves it successively closer to the opening of the bore so as to compensate for the lining wear. Referring to FIGURE 4, the adjusting mechanism of the invention comprises a rod 22 having a lost motion connection with the end wall of the cylinder bore providing a clearance $j$ and having a one-way connection with the piston, as will be seen later, formed in the inner surface of the end wall of the cylinder bore, concentrically of the bore, is a stepped circular recess 25. Into the recess 25 is inserted a generally U-shaped thrust washer 24 which bears against the shoulder in the recess and is secured in place by pressing over portions of the end wall (FIGURE 1). The rod 22 is inserted into the slot 27 of the washer so that the latter straddles a reduced diameter portion 26 of the rod. At least one radial lug 28 formed on the washer projects in a corresponding notch 29 in the recess wall and prevents the washer from rotating. The rod 22 is generally cylindrical with two parallel flat shanks 30, and the slot 27 is only slightly wider than the distance between the shanks, whereby the rod is prevented from rotating. When the rod is centered with respect to the cylinder bore, its extent of movement with respect to thrust washer 24 is limited by the abutment of either radial wall of the reduced diameter portion 16 with a corresponding edge of the slot 27.

The piston is provided with a counterbored blind hole 32 extending axially concentrically to the piston from the base thereof. Into the counterbored portion of the hole 32 is inserted a gripping washer or adjusting member 36 having two resilient inclined fingers 38. The washer is secured to the piston by peening metal portions 39 of the base of the piston over the washer. Since the washer 36 and piston 14 should be assembled in a predetermined orientation, there is preferably provided a lug (not shown) mating with a notch in the piston base when the two parts are in proper angular position.

When the gripping washer 36 and rod 22 are so angularly positioned that the inclined fingers 38 confront the cylindrical portions of the rod, the fingers bear on the rod surface and form a one-way clutch between the rod and washer. A relative rotation of a quarter of a turn from the engaged position separates the rod from the fingers, the distance of which is determined for being larger than the corresponding piston width.

The piston 14 is preferably formed with a terminal boss 41 which contacts the corresponding friction pad 16 and which has axial parallel shanks 40 which permits insertion of the shanks into pad 16 only when the shanks are in a predetermined angular position for which the adjusting mechanism is operative. Constructions other than a boss with axial flats may of course also be used and any device adapted to maintain the piston in its proper angular position would be suitable. In the same way, the embodiment of the rod 22 shown in the drawings is not limitative, any rod having a width variable with the considered cross section would be adapted for use with a grip washer of corresponding shape. It would be also possible to use a threaded rod or a rod having a washer of successive part-circular grooves. The drawback of each device is of course that the adjustments take place in distinct increments.

The operation of the mechanism is as follows: Upon admission of fluid under pressure into the cylinder bore from a master cylinder or a control valve (not shown) the piston is formed away from the cylinder end wall and pulls the rod 22. If the amount of piston movement does not exceed the lost motion $j$ between the thrust washer 24 and the upper face of groove 26 (FIGURE 2), there does not occur any relative movement between the piston and the rod coupled thereto by the friction force exerted by the grip washer 34 on the rod. If during brake application the disk deflects laterally, the complete sliding assembly (friction pads and saddle) moves with respect to the support plate without any change in the relative position of the piston and cylinder; if due to lining wear the piston displacement for applying the friction pads exceeds the lost motion $j$, the gripping washer permits the rod to slip substantially frictionless since the piston movement tends to open the inclined fingers 38.

Upon release of the fluid pressure in the cylinder bore 12 the return springs (or the resiliency of the friction pads) make the piston 14 and rod 22 move back in unison through the clearance $j$. Each movement in excess of the clearance is prevented by the abutment of the lower face of the groove 26 against the thrust washer 24 (FIGURE 4).

If deflection of the disk axis occurs during brake release and the disk portion in front of the friction pads deflect and forces either friction pad away from its normal position, the gripping force of washer 36 opposes pad movement with a force high enough to displace the sliding saddle 6, 10 and 8 as a whole and prevents the rod and piston from moving relative to each other.

When the friction pads become worn out and should be replaced, the yoke member 10, which faces the anchoring lugs 19, is removed and the two friction pads may be slid laterally out of the guiding slots in the support member. The adjusting mechanism is then rendered inoperative by rotating the piston 14 a quarter of turn, the piston is pushed back to its initial position in the cylinder bore and leaves the place free to insert friction pads with new linings. An additional rotation of a quarter of a turn puts the adjusting mechanism in operating condition and establishes the piston in an angular position permitting the insertion of the friction pads. Any risk of assembling the brake with the adjusting mechanism out of operation is thereby avoided. Besides, vibrations or chatter in operation cannot result in piston rotation, since it is non-rotatably connected to the associated pad. When the friction pads have been inserted the yoke member 10 is again secured to the cylinder and brace member and the brake is in operating condition since no intervention has been made on the hydraulic circuit which need not be bled. In order to prevent the piston from being inadvertently removed from the cylinder bore, a snap ring 42 may be provided to limit the stroke of the piston to a value slightly in excess of that corresponding to the complete wear of the linings.

Referring to FIGURE 3, there is shown a modified form of the adjusting mechanism suitable for use in a disk brake of the "fixed caliper" type, having two or more hydraulic cylinders whose pistons apply two friction pads with equal forces against opposite faces of a rotating disk fixed against axial movement. For a complete description of a brake of this type, reference is made for instance to Desvignes et al. U.S. patent application Serial No. 726,885, now abandoned.

The use of a direct connection between the piston 14 and rod 30 upon movement of the piston away from the friction pad 16 as described with reference to FIGURES 1–2 is not desirable in such a brake. If the rod is mounted between a piston and its cylinder and the deflection of the disk toward the corresponding friction pad exceeds the lost motion $j$, the disk will produce a force on the piston which will be transmitted to the rod through the gripping resistance of the inclined fingers 38. The piston and rod will be prevented from moving since the lower face of the rod 30 will be engaging the washer 24; rapid grooving of the rod and rounding of the edge of the inclined fingers and loss in adjuster effectiveness will occur, or even breakage of an adjuster part will take place.

The adjusting mechanism according to the invention overcomes this shortcoming by providing a resilient connection having a stiffness higher than that of the return springs (if such exist in the brake), which yields when disk deflection during the periods of pressure release forces the piston back into the cylinder; and positively returns the piston to its proper adjusted position as soon as disk deflection ceases.

In addition to the parts already described in FIGURES 1–2, which bear the same reference number with a prime mark affixed thereto and perform the same functions, the adjusting mechanism of FIGURE 3 includes a resilient connection having a coil spring 43 loaded between the gripping washer or adjusting member 38' and the shoulder 46 of a counterbore in the piston hole 32'. In this embodiment the washer 38' is not secured to the piston 14' but axially movable against the compression force of spring 43 which normally forces it against an annular flange or projections 44 of the piston pressed over the gripping washer 38'. Such flange or projections may obviously be substituted with a split lock ring located in a peripheral groove in the wall of the counterbore. The washer 38' is prevented from rotating by some form of splined connection between the washer and piston, such as formed by axial ribs 37 in the lateral wall of the hole 32' received in radial notches 39 of the washer 38'.

The preload of spring 43 compressed between the washer 38' and the end wall 46 of the counterbore may preferably be higher than the maximum return force exerted on the pad, in order to prevent the spring 43 from deflecting when the hydraulic pressure in the cylinder bore 12' is released. As a result, the complete compression stroke of spring 43 remains available to compensate for disk deflection.

If the disk temporarily exerts a force on one of the pads when the brake is in its rest condition, the pad pushes back the piston and compresses the corresponding coil spring 43. The main part of the fluid volume forced out of the cylinder is returned to the master cylinder, as the force of the return spring associated with the other piston, the frictional resistance of the other piston and the pressure loss in the passage (not shown) connecting the cylinders cooperate to oppose movement of said other piston. As soon as the disk deflection ceases, the spring 43 returns the piston 14' to the adjusted position and the necessary volume of fluid is admitted from the master cylinder or control valve without any appreciable time delay.

It should be noted that the system is to be designed so that return flow occurs from the cylinder in contraction to the master cylinder, since fluid flow from one cylinder to the other would eventually move the other piston toward the disk in excess of the lost motion ($j$) and would result in over-adjustment.

It is to be understood that the resilient deflection absorbing mechanism of the invention is by no means limited in its use to an automatic adjuster which is rendered inoperative upon rotation of the element to be adjusted. Neither is the use of the compensating feature in a caliper disk brake exclusive. The deflection absorbing mechanism may be embodied in any type of automatic adjuster which comprises a wedging coupling and is likely to be subjected to return movement in excess of the normal clearance. As the brake of FIGURE 1, the caliper disk brake of FIGURE 3 may be provided with means for preventing the piston from leaving the angular position for which the automatic adjuster is operative.

No return springs have been shown on FIGURE 1 or 3, since such spring may affect any conventional forms as well known in the art. Although the invention has been described in conjunction with selected embodiments, it will be understood by those skilled in the art that numerous modifications, additions and revisions may be made of the invention without departing from the underlying principles thereof. It is intended, therefor to include within the terms of the following claims all such modifications, revisions and additions which are reasonably expected from those skilled in the art.

I claim:

1. In a disk brake assembly having a rotatable disk, an automatic adjusting and kickback device comprising: a cylinder housing on one side of said disk having a chamber closed by a wall at its rear end and open at its forward end opposite said one side of said disk, a piston mounted in said chamber for reciprocable slidable movement therein, an axially extending cavity in said piston opening into the rear end thereof, an axially extending elongated member operatively connected at one end to said wall and extending into said cavity of said piston, a self-gripping adjusting member surrounding said elongated member and gripping the same, means for engaging the rear of said adjusting member operatively connecting said piston to said adjusting member to provide a thrust connection between said piston and said adjusting member for overcoming said gripping connection between said adjusting and elongated members to move said adjusting member to a new gripping position on said elongated member during forward movement of said piston, said connecting means being arranged to move rearwardly away from said adjusting member with said piston relative to said elongated member upon rearward movement of said piston effected by the disk during a kickback condition, a spring located within said cavity and being operatively connected to said piston and connecting means and reacting on said adjusting member opposing rearward movement of said piston and connecting means during kickback condition and urging said piston and connecting means forwardly relative to said adjusting member and said elongated member during kickback condition, the force of said spring being less than the self-gripping force of said adjusting member.

2. In a disk brake assembly having a rotatable disk, an automatic adjusting and kickback device comprising: a cylinder housing on one side of said disk having a chamber closed by a wall at its rear end and open at its forward end opposite said one side of said disk, a piston mounted in said chamber for reciprocable slidable movement therein, an axially extending cavity in said piston, an elongated member operatively connected at one end to said wall and extending into said cavity of said piston, a self-gripping adjusting member surrounding said elongated member and gripping the same, flange means carried by said piston extending from the wall of said cavity in a direction transverse to and towards the axis of said cavity, said flange means being operatively connected to the rear of said adjusting member to provide a thrust connection between said piston and said adjusting member for overcoming said gripping connection between said adjusting and elongated members to move said adjusting member to a new gripping position on said elongated member during forward movement of said piston, the operable connection of said flange means to the rear of said adjusting member being so arranged to allow said piston to move rearwardly away from said adjusting member relative to said elongated member upon rearward movement of said piston effected by the disk during a kickback condition, a spring located in said cavity and being operatively connected to said piston and reacting on said adjusting member opposing rearward movement of said piston during kickback condition and urging said piston forwardly relative to said adjusting member during kickback condition, the force of said spring being less than the self-gripping force of said adjusting member.

3. In a disk brake assembly having a rotatable disk, an automatic adjusting and kickback device comprising: a cylinder housing on one side of said disk having a chamber closed by a wall at its rear end and open at its forward end opposite said one side of said disk, a piston mounted in said chamber for reciprocable slidable movement therein, an axially extending cavity in said piston opening into the rear end thereof, an axially extending elongated member operatively connected at one end to said wall and extending into said cavity of said piston, a self-gripping adjusting member located within said cavity surrounding said elongated member and gripping the same, means for engaging the rear of said adjusting member operatively connecting said piston to said adjusting member to provide a thrust connection between said piston and said adjusting member for overcoming said gripping connection between said adjusting member and said elongated member to move said adjusting member to a new gripping position on said elongated member during forward movement of said piston, said connecting means being arranged to move rearwardly away from said adjusting member with said piston relative to said elongated member upon rearward movement of said piston effected by said disk during a kickback condition, a coil spring located within said cavity and surrounding said elongated member, said coil spring being operatively connected to said piston and connecting means and reacting on said adjusting member opposing rearward movement of said piston and connecting means during kickback condition and urging said piston and connecting means forwardly relative to said adjusting member and said elongated member during kickback condition, the force of said spring being less than the self-gripping force of said adjusting member.

4. In a disk brake assembly having a rotatable disk, an automatic adjusting and kickback device comprising:

a cylinder housing on one side of said disk having a chamber closed by a wall at its rear end and open at its forward end opposite said one side of said disk, a piston mounted in said chamber for reciprocable slidable movement therein, an axially extending cavity in said piston opening into the rear end thereof, an axially extending elongated member operatively connected at one end to said wall and extending into said cavity of said piston, a self-gripping adjusting member located within said cavity surrounding said elongated member and gripping the same, flange means carried by said piston extending from the wall of said cavity in a direction transverse to and towards the axis of said cavity, said flange means being operatively connected to the rear of said adjusting member to provide a thrust connection between said piston and said adjusting member for overcoming said gripping connection between said adjusting member and elongated member to move said adjusting member to a new gripping position on said elongated member during forward movement of said piston, the operable connection of said flange means to the rear of said adjusting member being so arranged to allow said piston to move rearwardly away from said adjusting member relative to said elongated member upon rearward movement of said piston effected by the disk during a kickback condition, a coil spring surrounding said elongated member, and located within said cavity, said coil spring being operatively connected at one end to said piston and reacting at the other end on said adjusting member opposing rearward movement of said piston during kickback condition and urging said piston forwardly relative to said adjusting member and said elongated member during kickback condition, the force of said spring being less than the self-gripping force of said adjusting member.

5. In a disk brake assembly having a rotatable disk, an automatic adjusting and kick-back device comprising: a cylinder housing on one side of said disk having a chamber closed by a wall at its rear end and open at its forward end opposite said one side of said disk, a centrally located axially extending recess in said end wall, flange means extending from a forward portion of the wall of said recess in a direction transversely to and toward the axis of said recess, a piston mounted in said chamber for reciprocable slidable movement therein, an axially extending cavity in said piston having a counterbored portion thereof opening into the rear face of said piston, flange means extending from the rear of the wall of said counterbored portion in a direction transverse to and towards the axis of said cavity, an adjusting member having a central opening therein and located in said counterbored portion of said cavity between said piston flange means and the shoulder of said counterbored portion, a generally axially extending elongated member having one end projecting into said piston cavity and through said opening of said adjusting member and its other end projecting into said recess, said adjusting member gripping said elongated member, said elongated member having a pair of axially spaced peripheral abutment shoulders defining a groove at said other end thereof receiving said recess flange means therein to provide a lost motion connection therebetween, a coil spring surrounding said elongated member and located in said counterbored portion of said cavity, one end of said coil spring acting on said shoulder of said counterbored portion and its other end on said gripping element for biasing said gripping element and said piston flange means into engagement with each other, and means for actuating said piston whereby upon forward movement of said piston beyond a distance permitted by said lost motion connection, the gripping connection between said adjusting member and said elongated member will be overcome and said adjusting member will be moved to a new position on said elongated member by said piston and upon rearward movement of said piston beyond the distance permitted by said lost motion connection, said piston will compress said coil spring and move rearwardly relative to said elongated member and said adjusting member.

6. The structure as recited in claim 5 wherein said gripping connection between said adjusting member and said elongated member includes a plurality of fingers on said adjusting member gripping a peripheral portion of said elongated member.

References Cited by the Examiner
FOREIGN PATENTS
882,926 11/1961 Great Britain.
1,205,904 8/1959 France.

MILTON BUCHLER, *Primary Examiner.*

FERGUS S. MIDDLETON, *Examiner.*

G. HALVOSA, *Assistant Examiner.*